Aug. 1, 1967 W. C. BURNS 3,333,338

WIRE LEAD CUTOFF TOOL

Filed June 13, 1966 2 Sheets-Sheet 2

3,333,338
Patented Aug. 1, 1967

3,333,338

WIRE LEAD CUTOFF TOOL

William Curtis Burns, Hershey, Pa., assignor to AMP Incorporated, Harrisburg, Pa.

Filed June 13, 1966, Ser. No. 557,088
8 Claims. (Cl. 30—233)

This invention relates to the art of cutoff tools and more particularly to a hand tool capable of severing to length a plurality of wire leads during one operation of the tool.

In the electronic field there is an ever increasing use of subminiature components which may be conveniently plugged into a printed circuit board or the like to become a portion of a circuit network. One such subminiature component is referred to as a "can," the can being an hermetically sealed container having an integrated circuit module therein. These cans have a plurality of wire leads extending therefrom for connection with a suitable socket contact. The leads are normally disposed in a regular array, i.e. circular, and are of a longer length than is necessary so that the leads can be severed by the customer to a predetermined length depending on the particular use of the can. The leads must be cleanly severed so as not to injure the socket contact upon insertion of the leads.

Aside from cutting the leads to an appropriate length there is the additional problem of achieving the proper spacing between the leads so that the can will mate with its associated socket. The spacing between centers of the socket contact is determined by various manufacturing considerations and is often larger than the center distance between the leads of the can. Therefore these leads must be expanded in order to correspond with the mating socket.

It is therefore a principal object of the present invention to provide a cutoff tool which will accurately sever wire leads to a predetermined length.

A further object is to provide a cutoff tool which will adjust the spacing between wire leads to facilitate mating of the leads with a corresponding socket.

A further object is to provide a cutoff tool which is capable of use with cans having varying numbers of projecting leads.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purpose of illustration in order that others skilled in the art may fully understand the invention and the principles thereof and the manner of applying it in practical use so that they may modify it in various forms, each as may be best suited to the conditions of a particular use.

In the drawings, in which like reference numerals refer to like parts:

Figures 1, 3, 4, 5:
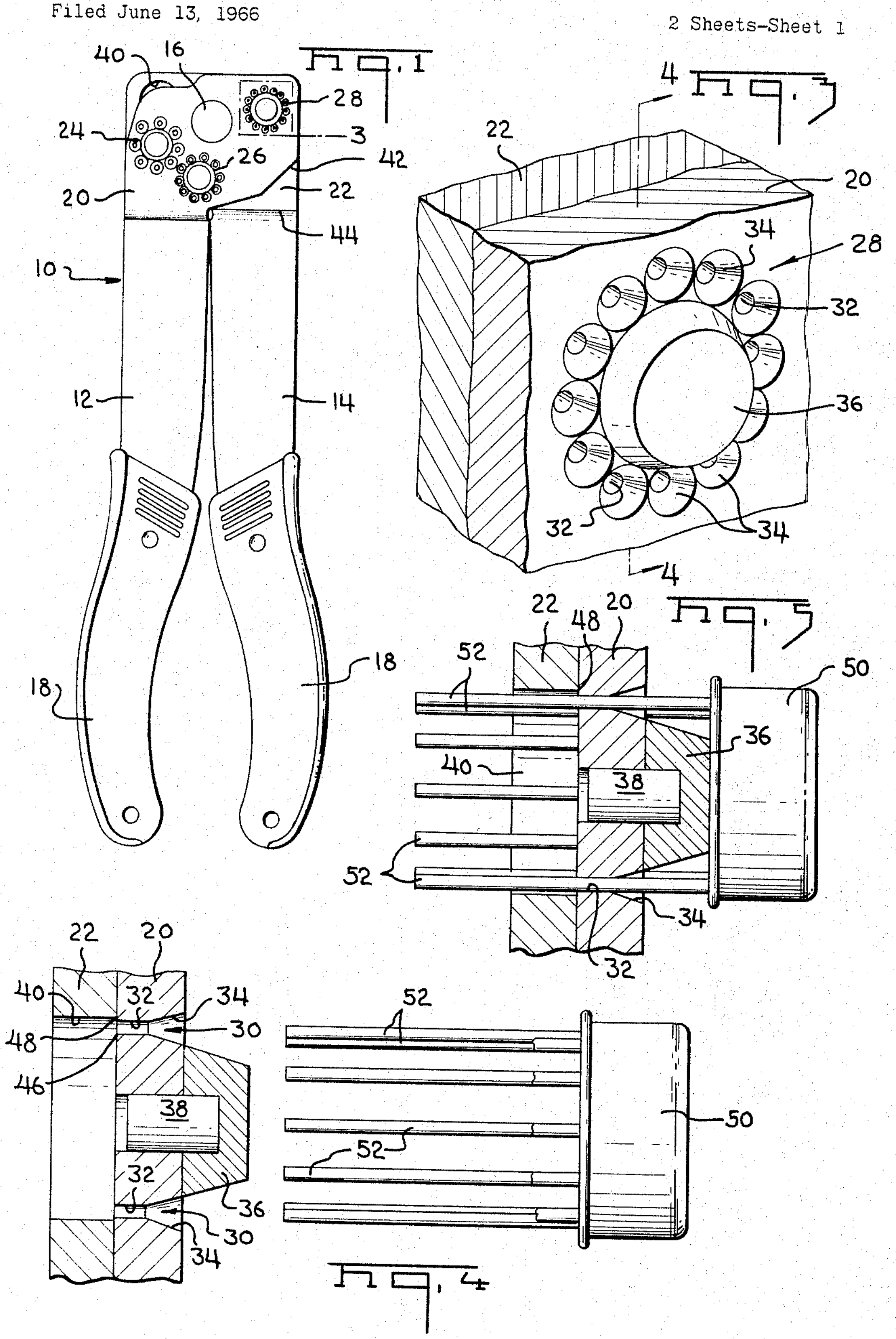
FIGURE 1 is an overall plan view of the cutoff tool representing a preferred embodiment of the present invention.
FIGURE 3 is an enlarged perspective view of the area within the phantom lines in FIGURE 1.
FIGURE 4 is a cross-sectional view taken along the line 4—4 of FIGURE 3 and showing a can about to be received within the apertures of the cutting die.
FIGURE 5 is a cross-sectional view similar to FIGURE 4 and showing the can positioned with the leads extending through the apertures in the die.
Figures 2, 6:
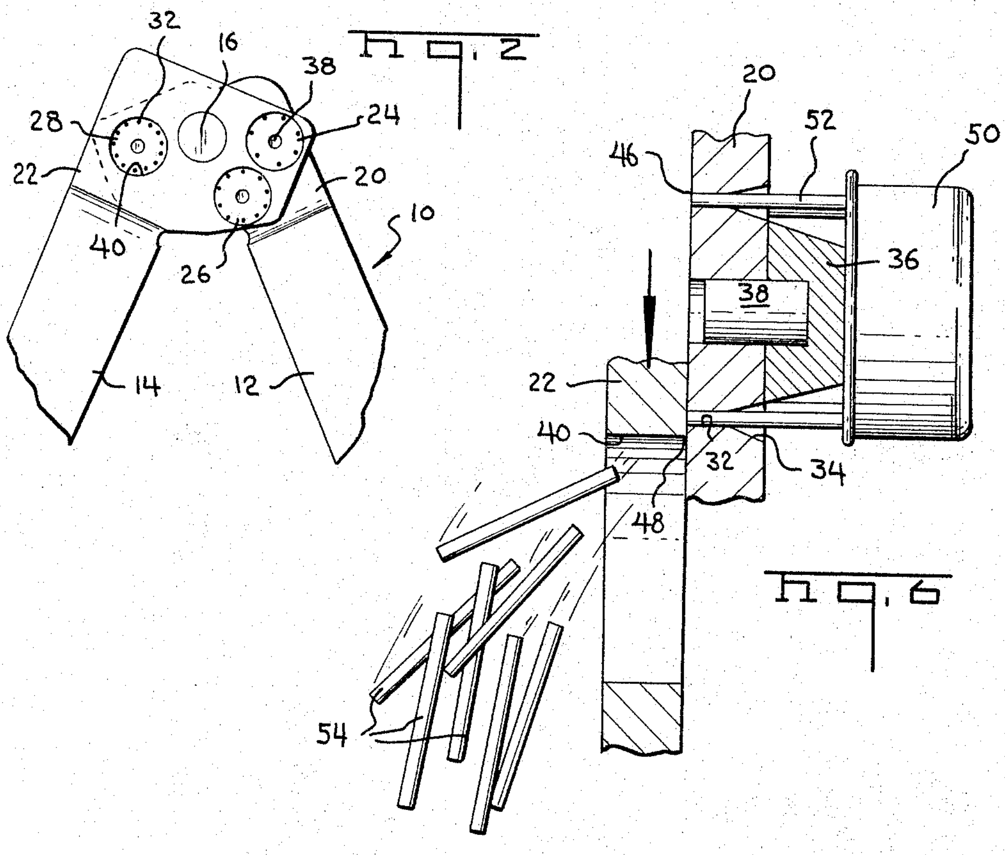
FIGURE 2 is a bottom plan view partly broken away showing the tool of FIGURE 1 in its open position.
FIGURE 6 is a cross-sectional view similar to FIGURES 4 and 5 and showing the cutting dies subsequent to a severing operation.

The hand tool indicated generally at 10 is best seen in FIGURES 1 and 2 and comprises a pair of arms 12 and 14 pivotally connected at 16 by a rivet or the like. A pair of handles 18 are secured to the arms 12 and 14 and provide means by which an operator may grasp the tool. The handles 18 may be of a suitable material such as plastic or rubber or the like.

Arm 12 has an end portion 20 which overlaps a corresponding end portion 22 on the arm 14. End portion 20 has three series of apertures formed therein for receiving the fire leads of a can. Commercially available cans are supplied with a varying number of leads extending therefrom, with the usual numbers being 8, 10 and 12. The series 24 is adapted to receive an 8 lead can while the series 26 and 28 are adapted to receive 10 and 12 lead cans respectively. As shown in the drawings a series of apertures are arranged in a circular configuration since this is the most common disposition of the leads extending from a can. However the apertures are not restricted to a circular configuration and may be of other regular geometric shapes such as a square or a rectangle depending upon the configuration of the particular socket in which the can will be mounted.

As can be seen in FIGURES 3 and 4 the individual apertures 30 of each series are relatively small and comprise a cylindrical portion 32 and a tapered lead in portion 34. As will be apparent the tapered portion serves the dual function of facilitating entry of the lead into the cylindrical portion of the aperture and also provides for orienting the leads to change their center to center distance in order to conform with a particular receiving socket.

A gage or stop member 36 is provided within each series of apertures and is advantageously in the form of a truncated cone. The gage is secured to the end portion 20 of arm 12 by suitable means such as a drive pin 38. The gage 36 has a diameter at its point of attachment to the portion 20 which is of sufficient size to intersect the tapered portions 34 of the series of apertures. Therefore the gage serves as a continuation of the tapered portions of the apertures to aid in the lead in and forming functions of the apertures.

As best seen in FIGURE 2 the end portion 22 of arm 14 is provided with three relatively large apertures 40 corresponding with the series of apertures 24, 26 and 28 on the arm 12. When the arms 12 and 14 are in their fully opened position the large apertures 40 will be in alignment with each of the series of small apertures to thereby permit insertion of the leads of a can in a manner as shown in FIGURE 5. The fully opened position of the arms 12 and 14 is determined by a pair of stop shoulders 42 located on the end portions 20 and 22, which shoulders cooperate with the raised surfaces 44 on the arms 12 and 14. The inner surface 46 of each aperture 30 and the inner surface 48 of each large aperture 40 constitutes a cutting edge whereby upon movement of the arms 12 and 14 to their closed position as seen in FIGURE 1 the large apertures 40 will be caused to move across each of the small apertures 30 of their corresponding series of apertures whereby the leads extending through the apertures will be severed by the cooperation of the cutting surfaces 46 and 48.

In FIGURE 4 there is shown a typical can 50 having a plurality of leads 52 extending therefrom. The individual leads 52 of the can will be received in the apertures 30 in a manner as shown in FIGURE 5 when the tool is in its open position. As the handles are closed the large aperture will be displaced relative to the small apertures as can be seen in FIGURE 6 causing severing of the leads and allowing the scrap pieces 54 to fall freely from the tool. The length of the severed leads is determined by the height of the gage or stop members 36, which members may be replaced by different gages of differing heights whereby the final lead lengths may be chosen as desired.

Figure 7:
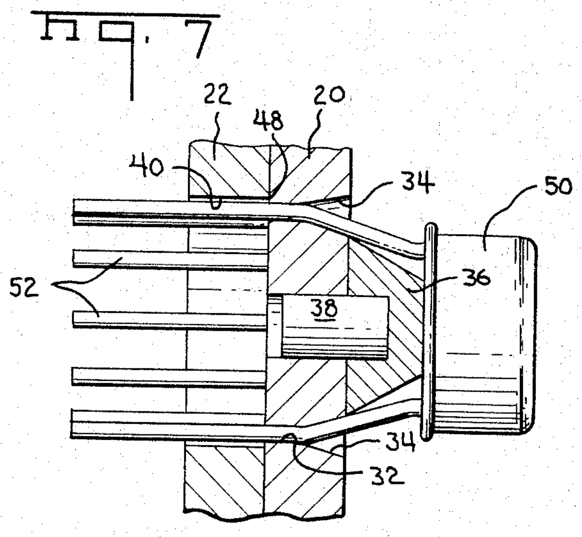
FIGURE 7 is a cross-sectional view showing the cutting dies performing an orienting function on the wire leads of the can.
Figure 8:
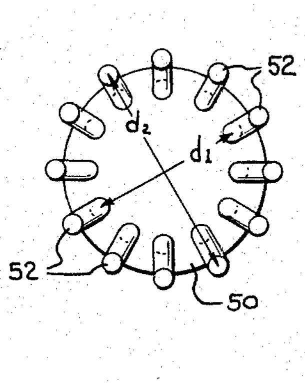
FIGURE 8 is a bottom plan view of a can having leads which have been formed and severed by the tool of the present invention.

As mentioned above, the spacing between the individual leads extending from a can is often different from the spacing of the socket contacts into which the can will be plugged. To provide for this the apertures 30 of each series of small apertures are spaced at a center to center distance which is equal to that of the receiving socket. As can be seen in FIGURE 7 the gage 36 and tapered portions 34 of the apertures serve a forming function in that the leads 52 are caused to be displaced outwardly into the cylindrical portions 32 of the apertures prior to severing. When the severing has been completed the leads will have been permanently deformed to thereby retain their adjusted spacing and therefore fit properly within their sockets. By this means cans of varying size can mate with a particular socket through the expediency of forming the leads to the desired center to center distance and thereafter severing the leads to the desired length. The can shown in FIGURE 8 illustrates the final configuration of the leads after having been formed in a manner similar to that shown in FIGURE 7. The initial diameter $d_1$ of the leads has been expanded to the final diameter $d_2$, which final diameter corresponds to that of the socket contacts. As is evident by changing the diameter of the lead centers there is also changed the center to center distance between each lead.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

What is claimed is:

1. A wire lead cutoff tool comprising a pair of arms, pivot means connecting said arms for pivotal movement relative to each other, one said arm having a series of relatively small apertures extending therethrough and forming a geometric pattern, the other said arm having a relatively large aperture extending therethrough, said large aperture being in alignment with said series of small apertures when said arms are in a first position to permit insertion of wire leads, said large aperture being displaced from said series of small apertures when said arms are in a second position whereby said wire leads will be severed to length.

2. A cutoff tool as set forth in claim 1 wherein the apertured portions of the said arms are overlapping and juxtapositioned, each said aperture having an edge thereof constituting a cutting surface.

3. A cutoff tool as set forth in claim 1 wherein said small apertures are provided with a tapered portion to facilitate entry of said wire leads.

4. A cutoff tool as set forth in claim 3 wherein said tapered portions provide means for altering the spacing between the wire leads to be severed.

5. A cutoff tool as set forth in claim 3 further comprising gage means positioned within said series of small apertures, said gage means serving to determine the length of wire lead which is severed.

6. A cutoff tool as set forth in claim 5 wherein said gage means intersects the tapered portion of said small apertures whereby said gage means additionally facilitates the entry of said wire leads into said small apertures.

7. A cutoff tool as set forth in claim 1 further comprising a plurality of series of small apertures and a plurality of large apertures, each said large aperture being associated with one of said series of small apertures.

8. A cutoff tool as set forth in claim 7 wherein the number of small apertures in one said series is different from the number of small apertures in a second one of said series.

References Cited

UNITED STATES PATENTS

| | | | |
|---|---|---|---|
| 2,494,996 | 1/1950 | Geddes | 30—226 |
| 2,527,735 | 10/1950 | Johnson | 30—226 |
| 2,543,018 | 2/1951 | Hainline | 30—131 |

WILLIAM FELDMAN, *Primary Examiner.*

J. C. PETERS, *Assistant Examiner.*